(12) United States Patent
Saito

(10) Patent No.: US 7,654,811 B2
(45) Date of Patent: Feb. 2, 2010

(54) MOLD FOR MANUFACTURING A TUBE BY EXTRACTION

(75) Inventor: Kazuyuki Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 11/670,343

(22) Filed: Feb. 1, 2007

(65) Prior Publication Data

US 2007/0176318 A1 Aug. 2, 2007

(30) Foreign Application Priority Data

Feb. 2, 2006 (JP) .............................. 2006-025774

(51) Int. Cl.
*B29C 47/20* (2006.01)
(52) U.S. Cl. .................... 425/192 R; 425/380; 425/467
(58) Field of Classification Search ............. 425/195 R, 425/380, 467, 192 R
See application file for complete search history.

(56) References Cited

U.S. PATENT DOCUMENTS

| 2,151,540 | A | * | 3/1939 | Varga | .......................... | 138/117 |
| 3,274,315 | A | * | 9/1966 | Kawamura | ................... | 264/563 |
| 3,888,617 | A | * | 6/1975 | Barnett | ........................ | 425/380 |
| 3,929,951 | A | * | 12/1975 | Shibata et al. | ............... | 264/566 |
| 4,332,156 | A | * | 6/1982 | Broodman | .................... | 72/264 |
| 5,263,352 | A | * | 11/1993 | Yano | ............................ | 72/269 |

FOREIGN PATENT DOCUMENTS

| JP | 36-007540 B | 6/1963 |
| JP | 49-083753 | 8/1974 |
| JP | 57-043841 | 3/1982 |
| JP | 57-053328 | 3/1982 |
| JP | 62-255319 | 11/1987 |
| JP | 01-156034 | 6/1989 |
| JP | 06-000746 | 1/1994 |
| JP | 2004-174982 | 6/2004 |

* cited by examiner

*Primary Examiner*—Robert B Davis
*Assistant Examiner*—Joseph Leyson
(74) *Attorney, Agent, or Firm*—Workman Nydegger

(57) ABSTRACT

A mold equipped with a core having a plurality of branching columnar distal portions in the extrusion direction and a die having an aperture surrounding the distal portions. A softened flexible resin is injected from one end of a resin flow path formed between the core and the die and extruded in order to form a pipe material having a plurality of circular liquid flow paths which are mutually independent and have the same inner diameter. The distal portions of the core shaped as a row of circular distal portions aligned on the same axis, where the two edge distal portions have a smaller diameter than the distal portions disposed between the edge distal portions, while the portions of the aperture surrounding each of the distal portions have the same diameter.

3 Claims, 9 Drawing Sheets

320

MOLD FOR MANUFACTURING A TUBE BY EXTRACTION

BACKGROUND

1. Technical Field

The present invention relates to a mold and a manufacturing method, and in particular, relates to a mold used when manufacturing a tube by extrusion molding and a manufacturing method of a tube using the same.

2. Related Art

There exist a fluid transfer tube in which a plurality of mutually independent flow paths are integrally formed by a resin material. In JP-B-58-041180, manufacturing of a tube for piping equipped with tube portions of various specifications by a series of processes including extrusion molding is described. Thereby, manufacturing processes can be reduced as compared with the case of manufacturing by processing and building up a given metal tube. Note that the tube for piping described therein includes the one having the strength by which inlet backpressure or the like can be distributed.

In JP-UM-A-6-000746, a structure in which a plurality of mutually parallel ink tubes are integrated by simultaneous molding. Thereby for example, an ink tube which enables to simultaneously supply a plurality of color materials can be supplied at low cast.

In JP-B-7-002362, forming an opening having a predetermined bore diameter in a molded product by molding while injecting gas into inside of the molded product in the manufacturing of a pipe material by extrusion molding is described. Thereby size accuracy of the molded product which cannot be fully controlled only by a shape of a mold can be corrected.

As described above, a multi line tube having a plurality of flow paths can be preferably used in various devices in which a plurality kinds of fluids are simultaneously treated. The multi line tube having continuous flow paths can be manufactured by extrusion molding using a mold equipped with a core which defines inner surface shapes of the flow paths and a die surrounding the outer side of the core with a space with respect to the core. A melt state or softened state material resin is injected into such a mold from one end of a resin flow path formed between the core and the die and a molded product is continuously extruded from an extrusion opening formed at the other end of the resin flow path. Accordingly, a long molded product can be continuously molded by continuously supplying a material resin.

Incidentally, a plurality of flow paths having the same size are basically arranged in the specification of the multi line tube as described above. Accordingly, a mold having a core and die having the same size in response to each line of the multi line tube is fabricated. However, when a multi line tube is actually manufactured by using such a mold, there is a case that inner diameters of the flow paths mutually formed in the lines are different. In addition, in a particular application, a multi line tube in which flow paths having different diameters are combined may exist. At any rate, a multi line tube having the same inner diameter is a basic, so that a technology for manufacturing a multi line tube in which flow paths mutually having the same inner diameter are combined has been required.

SUMMARY

An advantage of a first aspects of the invention is that it provides a mold equipped with a core having a plurality of columnar distal portions branched at a downstream side in the extrusion direction and arranged on a surface and a die having an aperture surrounding the distal portions as a whole with a distance with respect to the distal portions. The mold is used in the case where a softened flexible resin is injected from one end of a resin flow path formed between the core and the die and a pipe material having a plurality of liquid flow paths which are independent formed by the flexible resin is extruded from the other end of the resin flow path. Here, the aperture of the die has a shape in which each part of a plurality of circles each having the same axis as a corresponding one of the distal portions and mutually having the same inner diameter are overlapped and mutually connected and each of a diameter of a distal portion of the core is lager than or equal to a diameter of a distal portion adjacent to the outer side in the arrangement. Thereby, the difference between inner diameters caused by pressure distribution of material resin can be eliminated and the multi line tube equipped with the plurality flow paths mutually having the same inner diameter can be manufactured.

Further, as for an embodiment, distal ends of the distal portions of the core extend to the outer side of the die form the aperture of the die in the mold. Thereby inner shapes of each flow path are faithfully reflected to a cross sectional shape of the core and the multi line tube having high size precision in inner surface shape can be manufactured.

Further, as for another embodiment, the core includes a proximal portion mutually connected with the distal portions in the mold. Thereby, the material resin is evenly supplied and the multi line tube equipped with a plurality of flow paths mutually having the same inner diameter can be manufactured.

Further, as a second aspect of the invention, there is provided a manufacturing method of a pipe material using a mold equipped with a core having distal portion branched into a plurality of portions at a downstream side in the extrusion direction and arranged on a surface and a die having an aperture surrounding the distal portions as a whole with a distance with respect to the distal portions and injecting a softened flexible resin from one end of a resin flow path formed between the core and the die and extruding a pipe material having a plurality of liquid flow paths formed by the flexible resin from the other end of the resin flow path. Here, the aperture of the die has a shape in which each part of a plurality of circles each having the same axis as a corresponding one of the distal portions and mutually having the same inner diameter are overlapped and mutually connected and each of a diameter of a distal portion of the core is lager than or equal to a diameter of a distal portion adjacent to the outer side in the arrangement. Thereby, the difference between inner diameters caused by pressure distribution of material resin can be eliminated and the multi line tube equipped with the plurality flow paths mutually having the same inner diameter can be manufactured.

It should be noted here that the summary of the invention described above does not list all necessary characteristics of the invention and a sub-combination of these characteristics groups may also be an invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the invention will be described through embodiments of the invention. However, the embodiments described below do not restrict the invention according to the claims. Further, it is not necessary that all of the combinations of characteristics illustrated in the embodiments are essential in the means to be solved by the invention.

Figure 1:
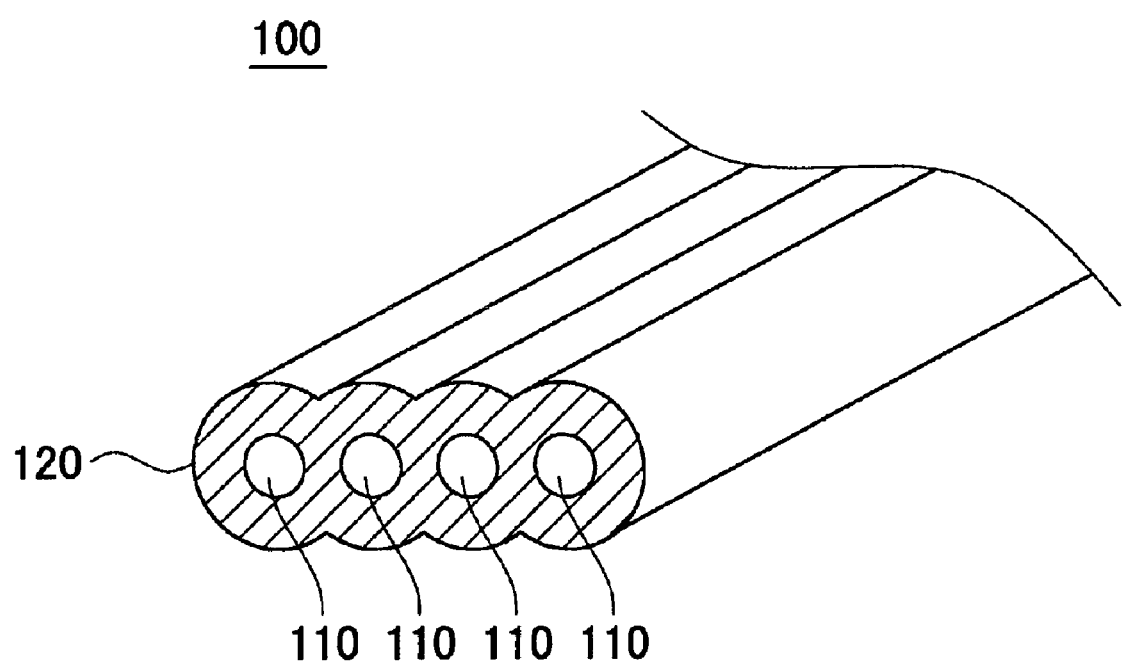
FIG. 1 is a perspective view showing a shape of a multi line tube 100 extrusion-molded by a mold 300 according to an embodiment.

FIG. 1 is a diagram showing an appearance of a multi line tube 100 manufactured by extrusion molding by using a mold 300 according to an embodiment. As shown in FIG. 1, the multi line tube 100 is formed by a resin molded product 120 integrally forming a plurality of parallel liquid flow paths 110 which are mutually independent. Each of the liquid flow paths 110 communicates in the longitudinal direction of the multi line tube 100 and enables to individually distribute fluid such as liquid, air or the like. Such a multi line tube 100 can be preferably used for communicating an ink cartridge and a recording head, for example, in an ink jet system recording apparatus equipped with a fixed type ink cartridge and a recording head which reciprocates on a recorded object. In this case, ink having mutually different color flows in each of the liquid flow paths 110.

Note that such a multi line tube 100 can be manufactured by extrusion molding of, for example, a resin material such as polypropylene (PP), polyethylene (PE), olefin series thermal plasticity elastomer (TPE), styrene series TPE, polyamide series TPE, urethane series TPE, or the like. Further, the multi line tube 100 can be constructed in a multi layer manner by combining a plurality of materials depending on type of fluid to be distributed.

Figure 2:
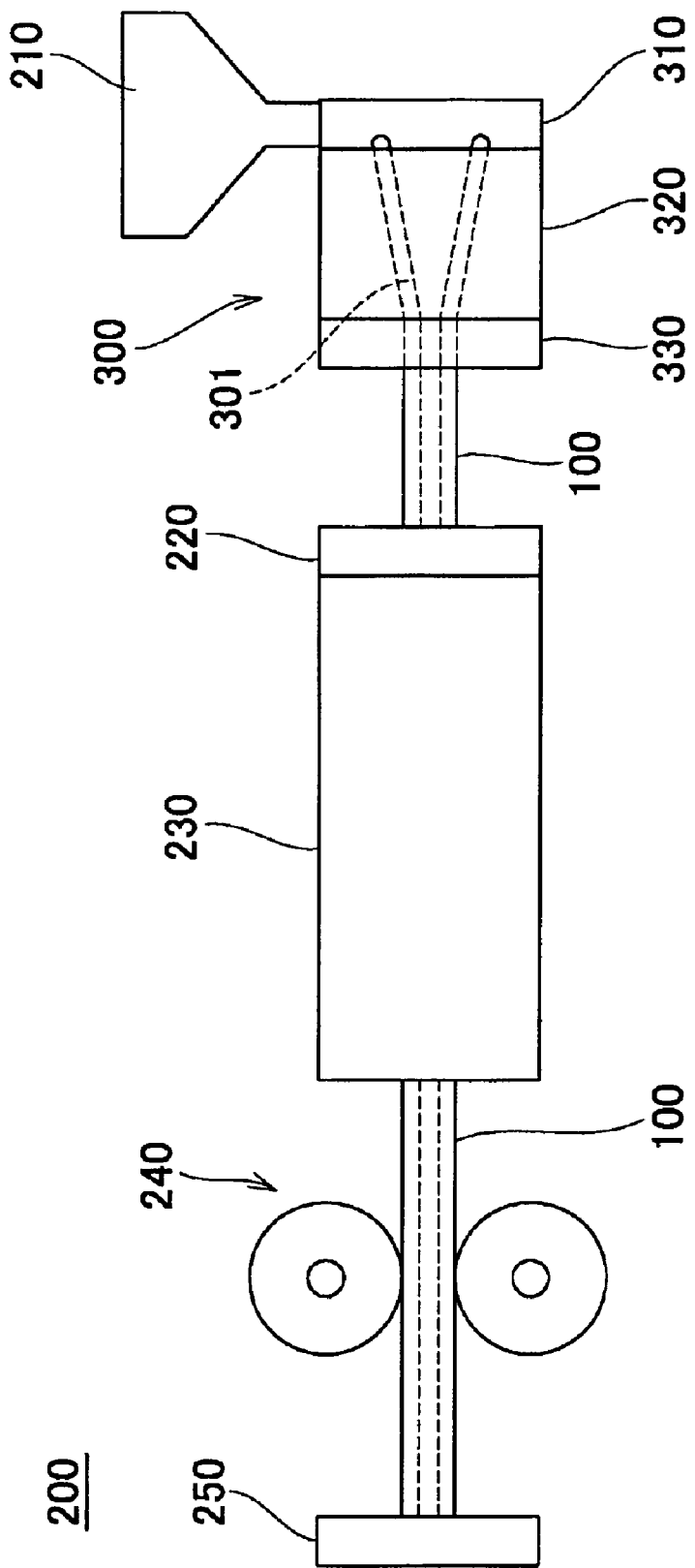
FIG. 2 is a diagram schematically showing a structure of an extrusion molding equipment 200 for manufacturing the multi line tube 100 shown in FIG. 1.

FIG. 2 is a diagram schematically showing a structure of an extrusion molding equipment 200 for manufacturing the multi line tube 100 shown in FIG. 1 by extrusion molding. As shown in FIG. 2, the extrusion molding equipment 200 includes a hopper 210 for supplying a resin material into the mold 300 described below. The resin material supplied into the mold 300 in a molten state from the hopper 210 is extruded from the mold 300 as the multi line tube 100, and then, routed through a sizing plate 220 which regulates size and a chiller 230 disposed immediate aftermath of the sizing plate 220 and picked up by a pick up device 240. Further, the picked up resin material is cut to a predetermined length by a cutting machine 250, thus making a product.

Here, the mold 300 is formed by combining a core plate 310 having a core portion which defines an inside shape of the multi line tube 100 to be extruded, a die plate 320 forming a resin flow path 301 by surrounding a circumference of the core portion 314 laminated on the core plate 310, and a lip plate 330 disposed on the termination of the mold 300 and defining an outer shape of the multi line tube 100.

Figure 3:
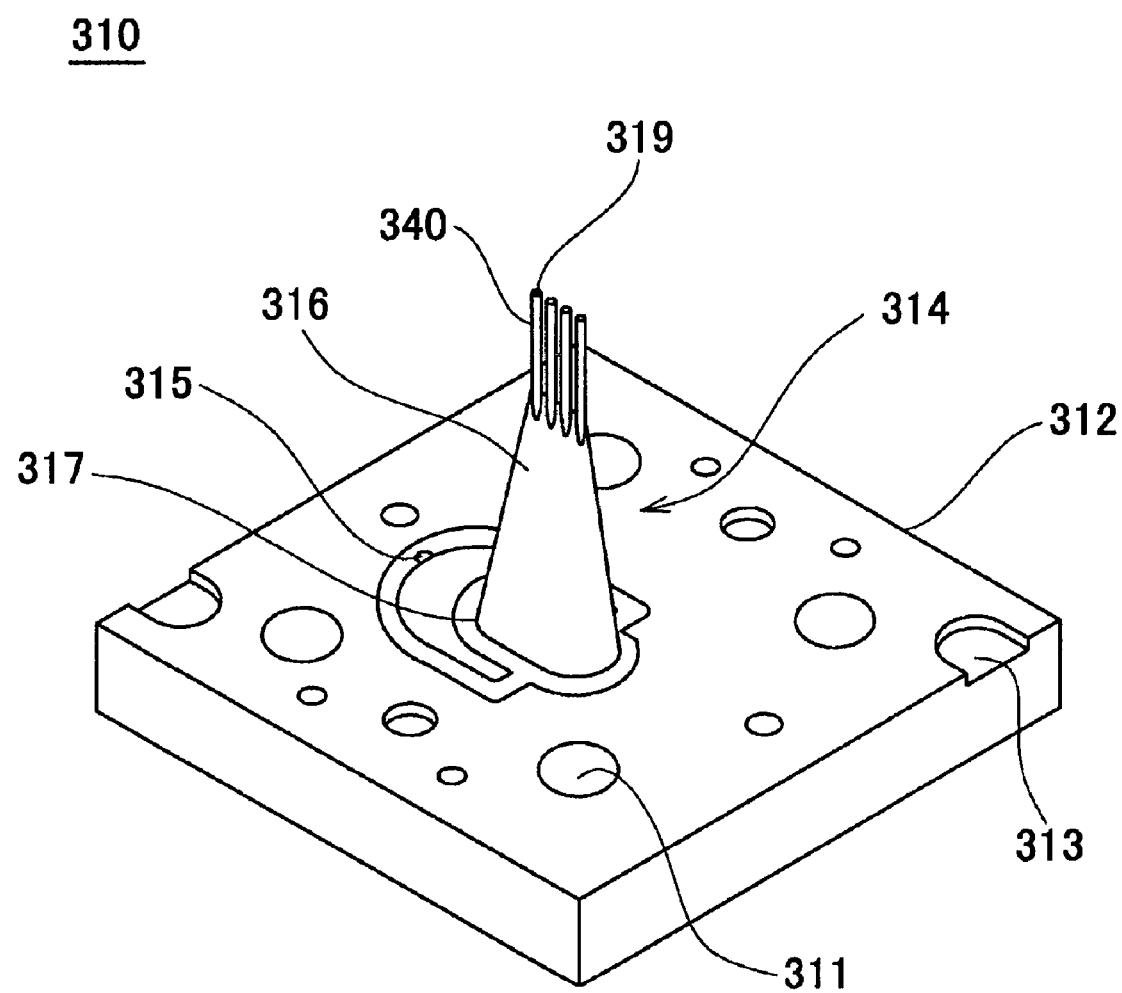
FIG. 3 is a perspective view separately showing a shape of a core plate 310 of the mold 300.

FIG. 3 is a perspective view separately showing the core plate 310 forming the mold 300 used in the above described extrusion molding equipment 200. As shown in FIG. 3, the core plate 310 includes a rectangular flange portion 312 having the same plane size as an outer shape of the mold 300 and a core portion 314 rising at approximately the center of the flange portion 312.

The flange portion 312 includes a fastening bolt opening 311 through which a fastening bolt is inserted when the core plate 310 is fastened with the die plate 320 and the lip plate 330 described below. Further, a cutout portion 313 into which a tool can be inserted when disintegrating after the mold 300 is once built up is also formed.

The core potion 314 includes a single proximal portion 316 and a plurality of distal portions 340 branched to be formed at the upper end of the proximal portion 316. Further, a resin guiding groove 317 for guiding a melted resin onto the surface of the core portion 314 is formed on the flange portion 312 and around the proximal portion 316. The resin guiding groove 317 is communicated with the hopper 210 through an injection opening 315.

Figure 4:
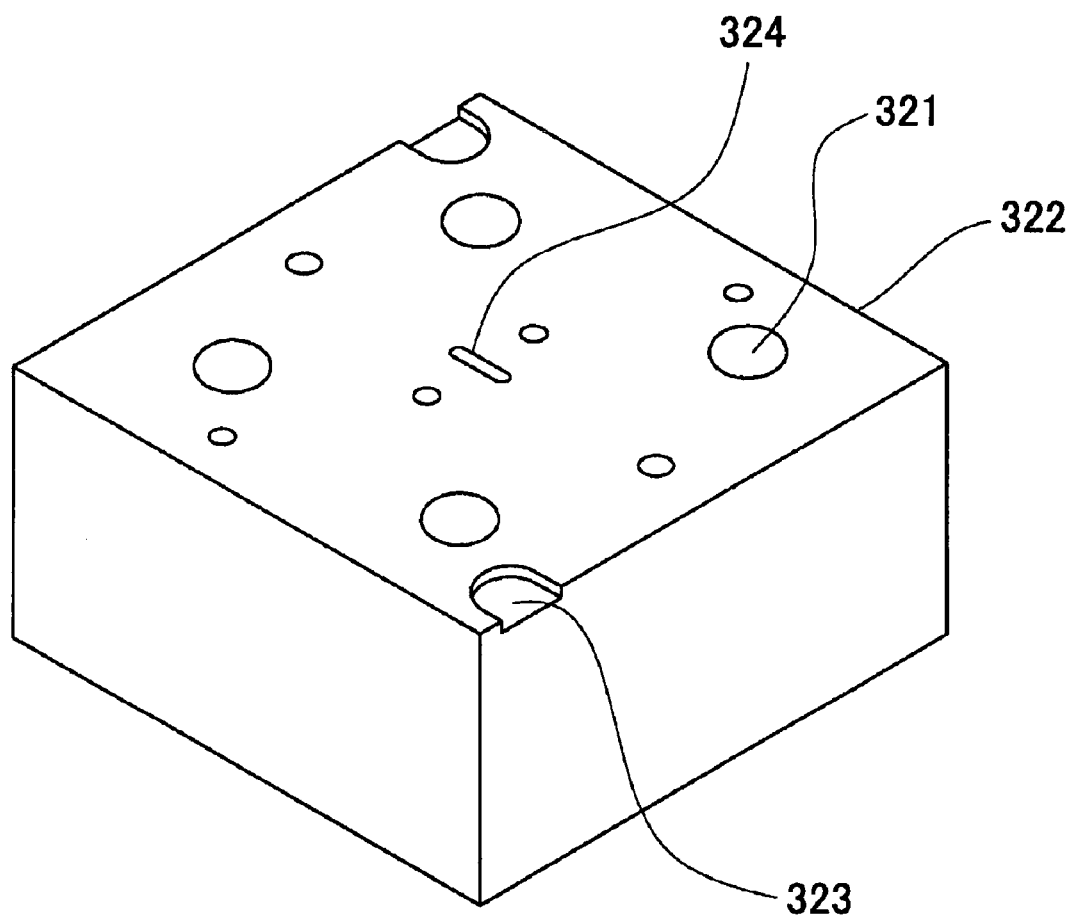
FIG. 4 is a perspective view separately showing a shape of a die plate 320 of the mold 300.

FIG. 4 is a perspective view separately showing a shape of the die plate 320. As show in FIG. 4, the die plate 320 includes a building frame 322 of a cube as a whole. A fastening bolt opening 321 through which a fastening bolt is inserted when building up as the mold 300 and a cutout portion 323 into which a tool is inserted when disintegrating are formed in the die plate 320. Further, a through opening 324 is formed at the center of the die plate 320.

In FIG. 4, only an aperture of the through opening 324 at upper end side can be seen. However, the through opening 324 is formed through the whole thickness of the die plate 320. In addition, the inner diameter thereof is enlarged toward downward and has an inner space one size larger than the core portion 314 of the core plate 310.

Figure 5:
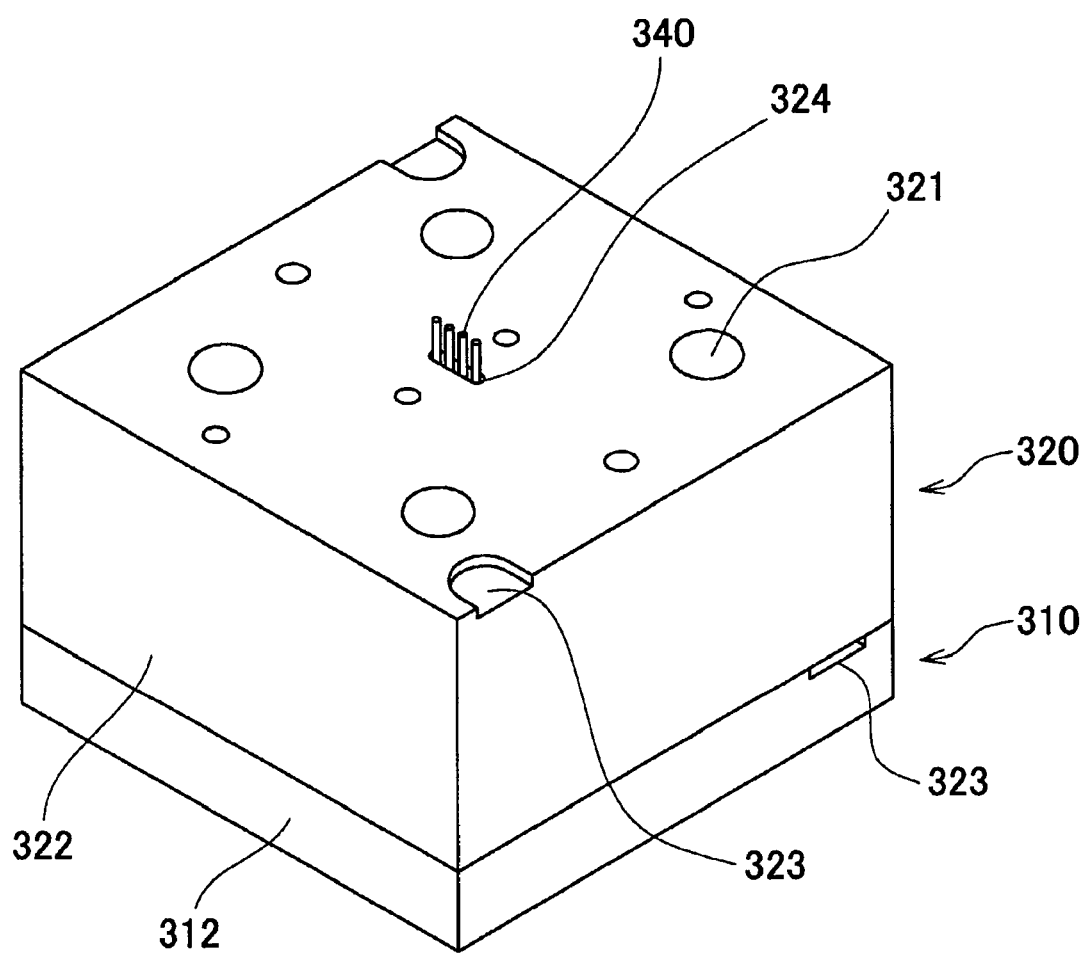
FIG. 5 is a perspective view showing a state in which the above described core plate 310 and the die plate 320 are built up.

FIG. 5 shows a state where the die plate 320 shown in FIG. 4 is combined with the core plate 310 shown in FIG. 3. As shown in FIG. 5, the flange portion 312 of the core plate 310 and the building frame 322 of the die plate 320 have mutually the same plane size, so that the core plate 310 and the die plate 320 are combined to be a one cube as a whole. In addition, the distal portion 340 of the core portion 314 extends on the upper side than the upper surface of the die plate 320 through the through opening 324.

Figure 6:
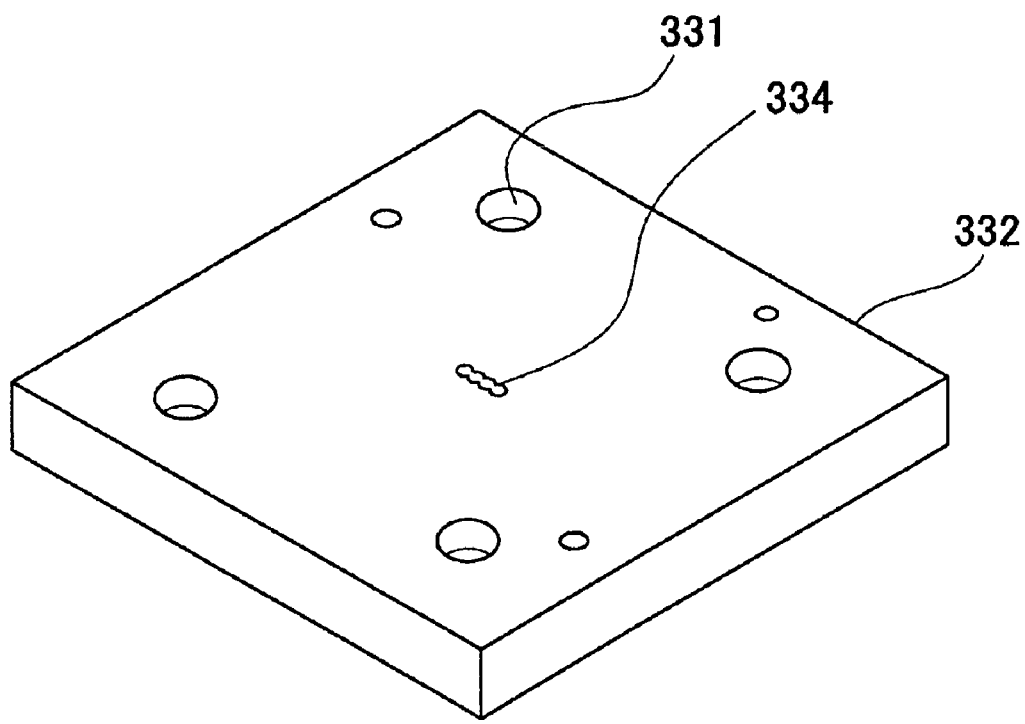
FIG. 6 is a perspective view separately showing a shape of lip plate 330 of the mold 300.

FIG. 6 is a perspective view separately showing a shape of the lip plate 330 of the mold 300. As shown in FIG. 6, the lip plate 330 is a rectangle plate 332 having the same plane size as the core plate 310 and the die plate 320 as a whole and has an extrusion opening 334 from which a molded product is extruded at the center. An inner surface shape of the extrusion opening 334 has a similar shape as a manufactured molded product, that is, an outer shape of the multi line tube 100 in the embodiment. In addition, the lip plate 330 includes a fastening bolt opening 331 which is engaged with the fastening bolt opening 321 of the die plate 320.

Figure 7:
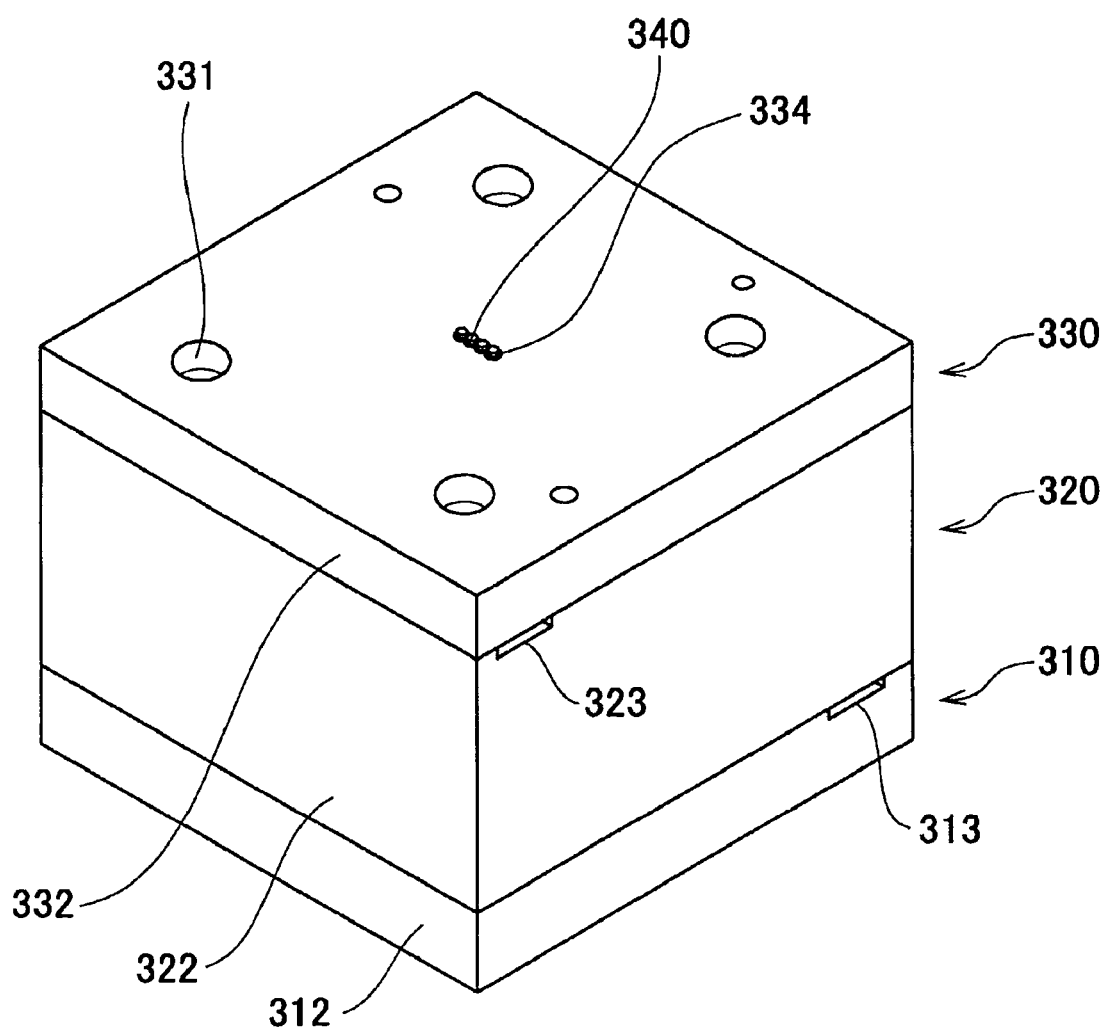
FIG. 7 is a perspective view showing a structure of the mold 300 with which the lip plate 330 is combined.

FIG. 7 is a perspective view showing a state in which the lip plate 330 shown in FIG. 6 is further combined with the combined body shown in FIG. 5. As shown in FIG. 7, the core plate 310, the die plate 320, and the lip plate 330 are mutually laminated and the cubic mold 300 as a whole are formed. In addition, the distal portion 340 of the core potion 314 is slightly projected from the extrusion opening 334 of the lip plate 330. Note that the core plate 310, die plate 320, and the lip plate 330 are integrated by the fastening bolt inserted in the fastening bolt openings 311, 321 and 331 although the fastening bolt is omitted in FIG. 7.

Figure 8:
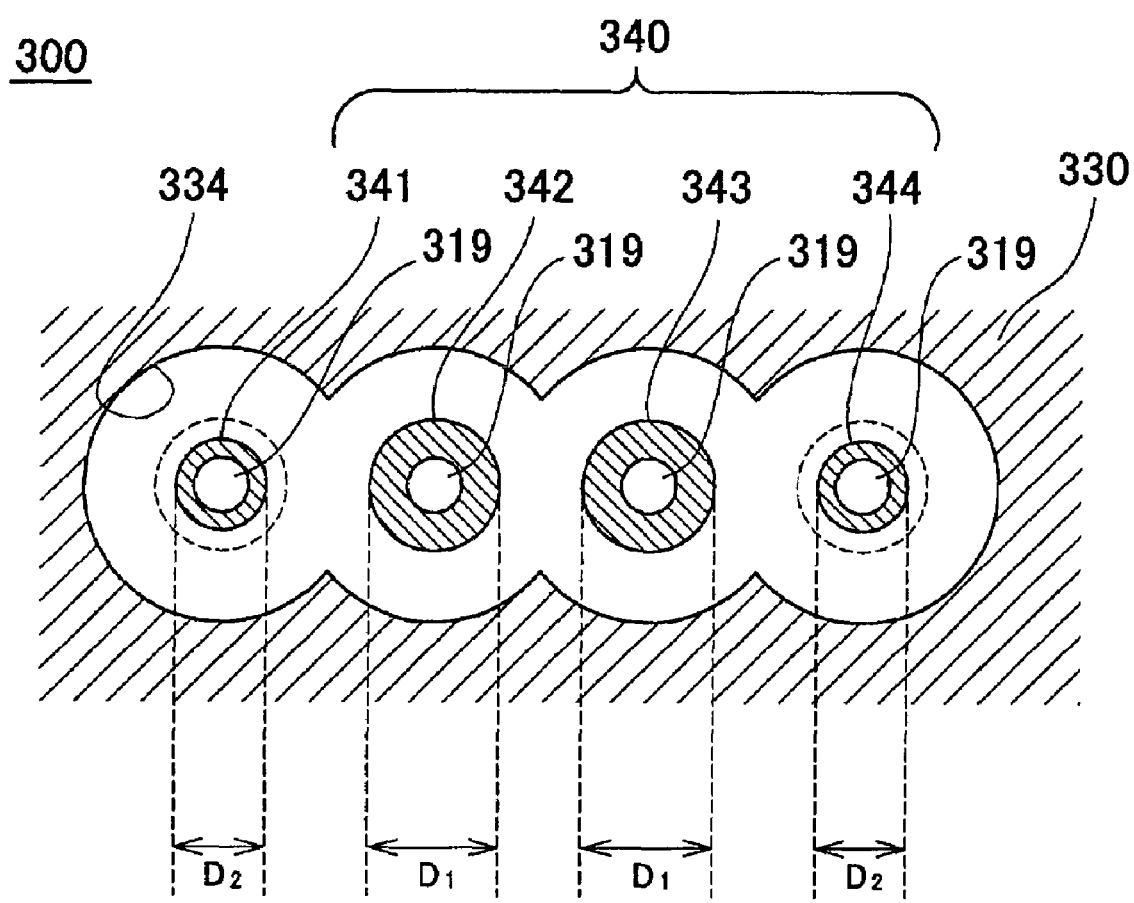
FIG. 8 is a diagram showing a shape of a distal portion 340 of a core at an extrusion opening 334 of the mold 300.

FIG. 8 is a diagram showing a shape of the distal portion 340 of the core in the inner portion of the extrusion opening 334 of the mold 300. Note that like reference numerals are used to denote like elements in FIG. 7 and the repeated descriptions will be omitted.

As shown in FIG. 8, the resin flow path 301 is formed between the surface of the core portion 314 and an inner surface of the die plate 320 in the inner portion of the mold 300. The extrusion opening 334 is a termination of the resin flow path 301 and an outer shape of the extruded resin molded product 120 follows the inner shape of the extrusion opening 334.

On the other hand, cross sectional shapes of the liquid flow paths 110 formed in the inner portion of the resin molded product 120 extruded from the extrusion opening 334 follow the shape of the distal portion 340 of the core portion 314. In this regard, when a material resin particularly used in molding has elasticity, there is a case that the size of the distal portion 340 of the core portion 314 and the inner diameter of the liquid flow paths 110 formed in the resin molded product 120 are different because the molding pressure applied to the resin material during molding is released after the molding.

On the contrary, in the mold 300 as shown in FIG. 8, the outer diameter of a pair of the distal portions 341 and 344 positioned at outer side is reduced than that of the distal portions 342 and 343 positioned at inner side. Thereby when the resin molded product 120 is released from molding pressure, the inner diameter of the liquid flow paths 110 corresponding to the both ends of the distal portions 341 and 344 becomes lager. As a result, the inner diameters of the liquid flow paths 110 corresponding to the distal portions 341, 342, 343, 344 become mutually equal.

To be more specific, the mold 300 was manufactured in which all of the inner diameter of each line of the extrusion opening 334 should be 5.3 mm, the outer diameter of the distal portions 342 and 343 of the core portion 314 positioned at inner side should be 1.9 mm, and the outer diameter of the distal portions 341 and 344 positioned at outer side should be 1.7 mm. Then, the resin molded product 120 extruded from the extrusion opening 334 was regulated in the sizing plate 220 shown in FIG. 2 and the multi line tube 100 in which outer diameter of each line becomes 4.3 mm was obtained. At this time, all of the inner diameters of the four liquid flow paths 110 were the same 1.6 mm.

Figure 9:
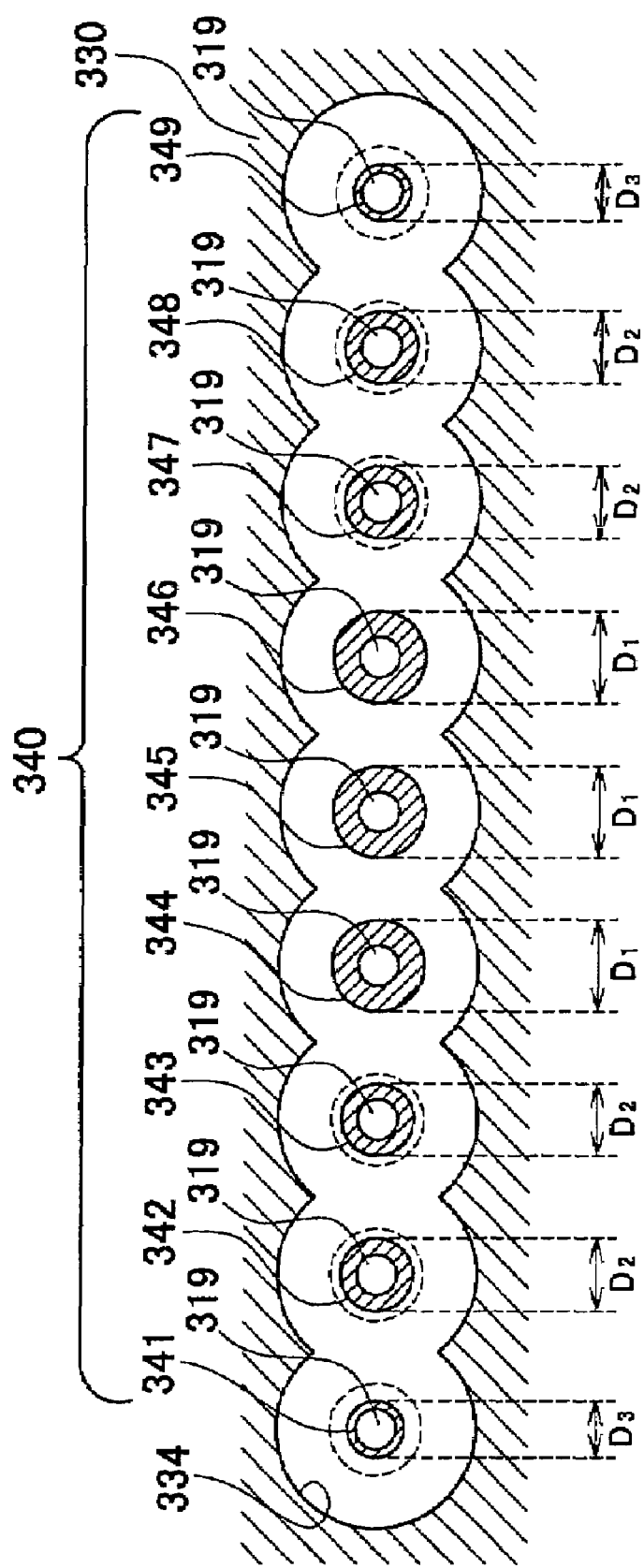
FIG. 9 is a diagram showing a shape of a distal portion 340 of a core at the extrusion opening 334 of the mold 300 in another embodiment.

FIG. 9 is a diagram showing a shape of the mold 300 preferably used in the case where another multi line tube 100 which is different in specifications is manufactured viewed from the same view point as in FIG. 8. The mold 300 shown in FIG. 9 is used when a multi line tube 100 having nine liquid flow paths 110 is manufactured. Here, three classes of diameters are mixed in the distal portion 340 of the core portion 314. That is, the pare of the distal portions 341 and 349 positioned at outermost sides has the most small diameter $D_3$ and three distal portions 344, 345 and 346 positioned at the center have the most large diameter $D_1$. Moreover, each two distal portions 342, 343 and 347, 348 positioned therebetween have an intermediate diameter $D_2$. In such a manner, the distal portions 340 of the core portion 314 are formed so that a diameter of a distal portion is larger than or equal to a diameter of a distal portion arranged at the outer side. As a result, the multi line tube 100 equipped with liquid flow paths 110 having even inner diameters can be manufactured.

The invention is described above by using the embodiments. However, the technical scope of the invention is not limited to the scope described in the above embodiment. It is obvious for the person skilled in the art that various modifications and changes can be made in the above embodiments. It is obvious that the embodiment in which such modifications and changes are made is also included in the technical scope of the invention from the description of the claims.

What is claimed is:

1. A mold equipped with a core having a plurality of columnar distal portions which branch from a surface toward a downstream side in the extrusion direction and a die having an aperture which surrounds all the distal portions so as to form a space a predetermined distance from the distal portions where a softened flexible resin is injected from one end of a resin flow path formed in the space between the core and the die and extruded from the other end of the resin flow path in order to form a pipe material having a plurality of independent liquid flow paths, wherein the aperture of the die has a shape in which each part of a plurality of circles each having the same axis as a corresponding one of the distal portions and mutually having the same inner diameter are overlapped and mutually connected, and the distal portions of the core are shaped as a row of circular distal portions aligned on the same axis, where the two edge distal portions have a smaller diameter than the distal portions disposed between the edge distal portions.

2. The mold according to claim 1, wherein distal ends of the distal portions of the core extend to the outer side of the die from the aperture of the die.

3. The mold according to claim 1, wherein the core includes a proximal portion mutually connected with the distal portions.

* * * * *

UNITED STATES PATENT AND TRADEMARK OFFICE
CERTIFICATE OF CORRECTION

| | |
|---|---|
| PATENT NO. | : 7,654,811 B2 |
| APPLICATION NO. | : 11/670343 |
| DATED | : February 2, 2010 |
| INVENTOR(S) | : Kazuyuki Saito |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 280 days.

Signed and Sealed this

Twenty-third Day of November, 2010

David J. Kappos
*Director of the United States Patent and Trademark Office*